United States Patent [19]

Fietz et al.

[11] Patent Number: 5,470,042
[45] Date of Patent: Nov. 28, 1995

[54] SUPPORTING DEVICE FOR A MACHINE

[75] Inventors: Ralf-Peter Fietz, Paderborn-Elsen; Franz Knoop, Büren-Steinhausen, both of Germany

[73] Assignee: Siemens Nixdorf Informationssysteme Aktiengesellschaft, Paderborn, Germany

[21] Appl. No.: 107,756
[22] PCT Filed: Feb. 21, 1992
[86] PCT No.: PCT/EP92/00365
§ 371 Date: Aug. 19, 1993
§ 102(e) Date: Aug. 19, 1993
[87] PCT Pub. No.: WO92/14963
PCT Pub. Date: Sep. 3, 1992

[30] Foreign Application Priority Data

Feb. 22, 1991 [DE] Germany .................. 41 05 691.4

[51] Int. Cl.⁶ .................................................. F16M 1/00
[52] U.S. Cl. .................... 248/678; 248/188.1; 248/677; 248/917; 312/351.1
[58] Field of Search .......................... 248/188.1, 188.2, 248/673, 675, 677, 678, 680, 681, 658, 500, 501, 346, 221.3, 222.1, 222.4, 223.1, 223.3, 224.3, 225.2, 298, 201, 65, 917; 312/351.1, 351.12

[56] References Cited

U.S. PATENT DOCUMENTS

| | | | |
|---|---|---|---|
| 3,521,217 | 7/1970 | Sebastian | 248/222.4 X |
| 4,079,907 | 3/1978 | Mykleby | 248/346 X |
| 4,368,867 | 1/1983 | Pendleton et al. | |
| 4,620,476 | 11/1986 | Brym | 248/201 X |
| 4,872,733 | 10/1989 | Tedham et al. | |
| 5,013,001 | 5/1991 | Liese | 248/221.3 |
| 5,020,768 | 6/1991 | Hardt et al. | 248/677 X |
| 5,131,616 | 7/1992 | Biba | 248/298 |
| 5,131,617 | 7/1992 | McGarrah | 248/681 X |
| 5,308,036 | 5/1994 | Olson et al. | 248/677 X |

FOREIGN PATENT DOCUMENTS

| | | |
|---|---|---|
| 8803519 | 11/1988 | Germany . |
| 2185388 | 7/1987 | United Kingdom . |

Primary Examiner—Ramon O. Ramirez
Assistant Examiner—Korie H. Chan
Attorney, Agent, or Firm—Hill, Steadman & Simpson

[57] ABSTRACT

A supporting device for a machine (2) standing on standing feet (4) at a distance from a floor surface of a floor. The supporting device has at least one supporting element (12), which has a holding part (44), which reaches, in an operating position, beneath the machine (2) and is detachably connected to a standing foot (4), and a supporting bracket (46) disposed thereon. The holding section (44) is configured as an essentially U-shaped bow having two arms (22, 24) which bear, in the fitted position, laterally against a standing foot (4). On the holding section (44) there are provided, perpendicular to the floor surface, stop faces (42), interacting with counter-faces of the standing foot (4), for fixing the holding section (44) to the standing foot (4). The arms (22, 24) are respectively provided, at their ends, with devices (25, 28) for coupling the said arms to the arms (24', 22') of a second supporting element (14).

8 Claims, 3 Drawing Sheets

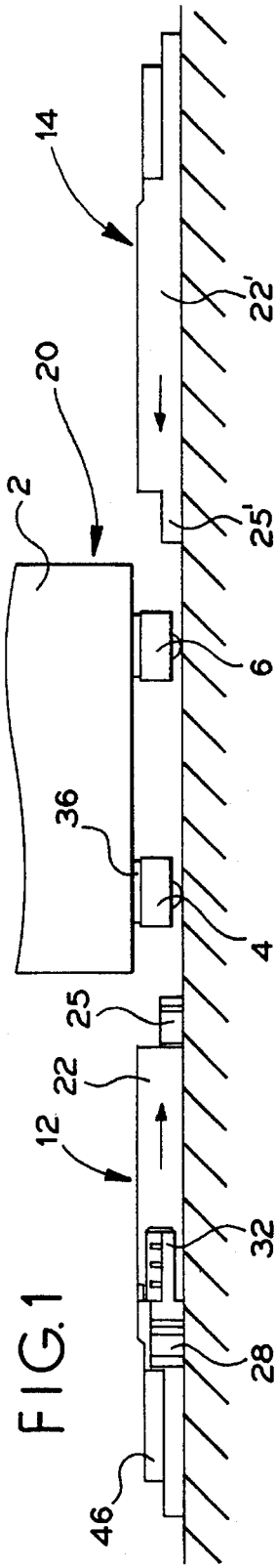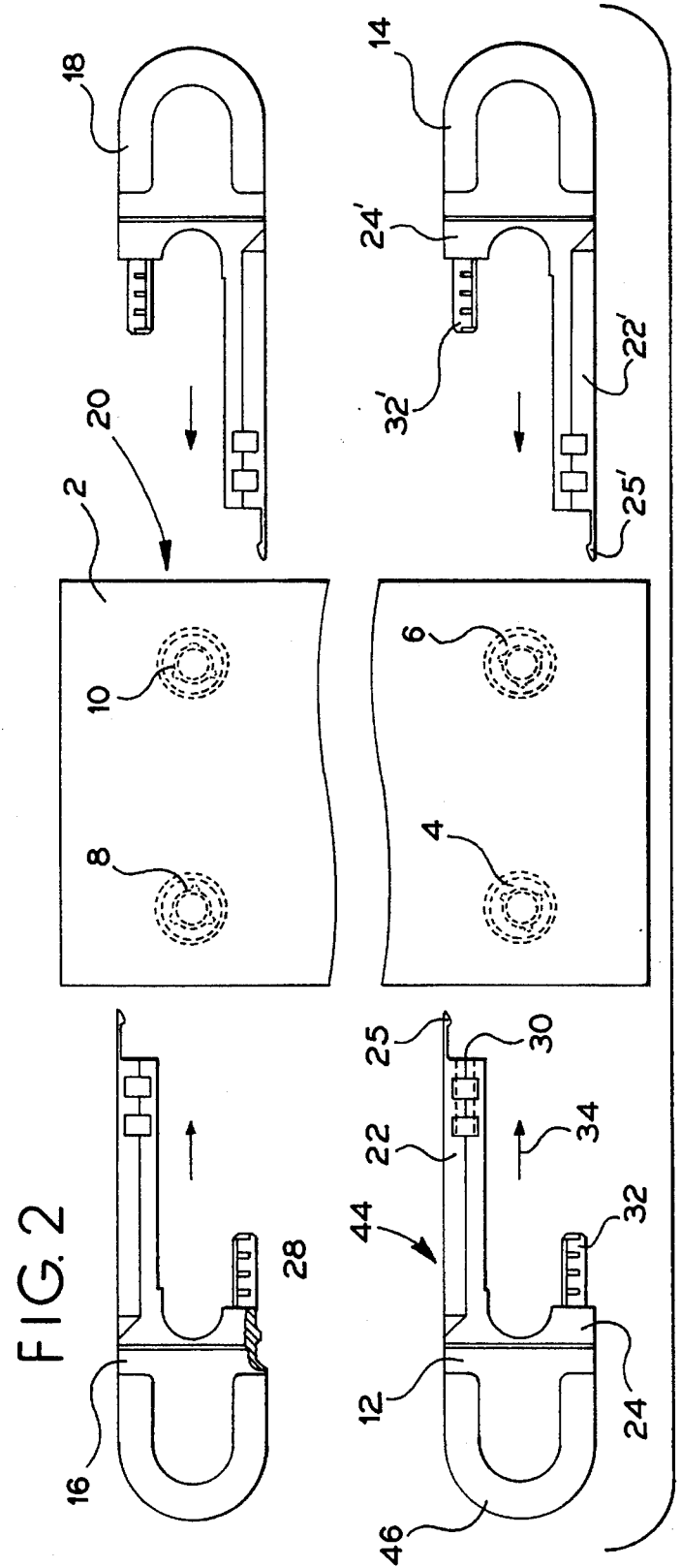

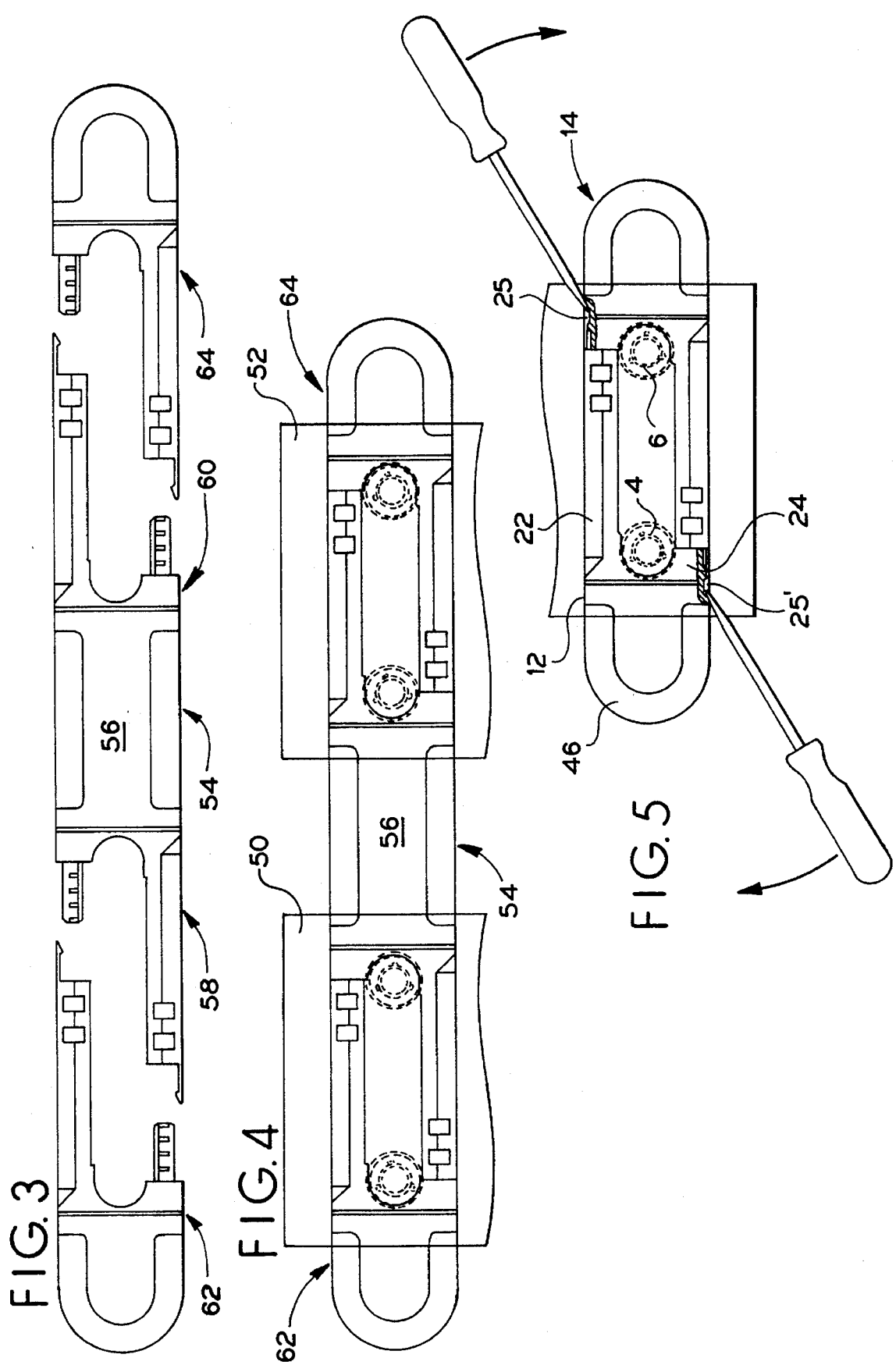

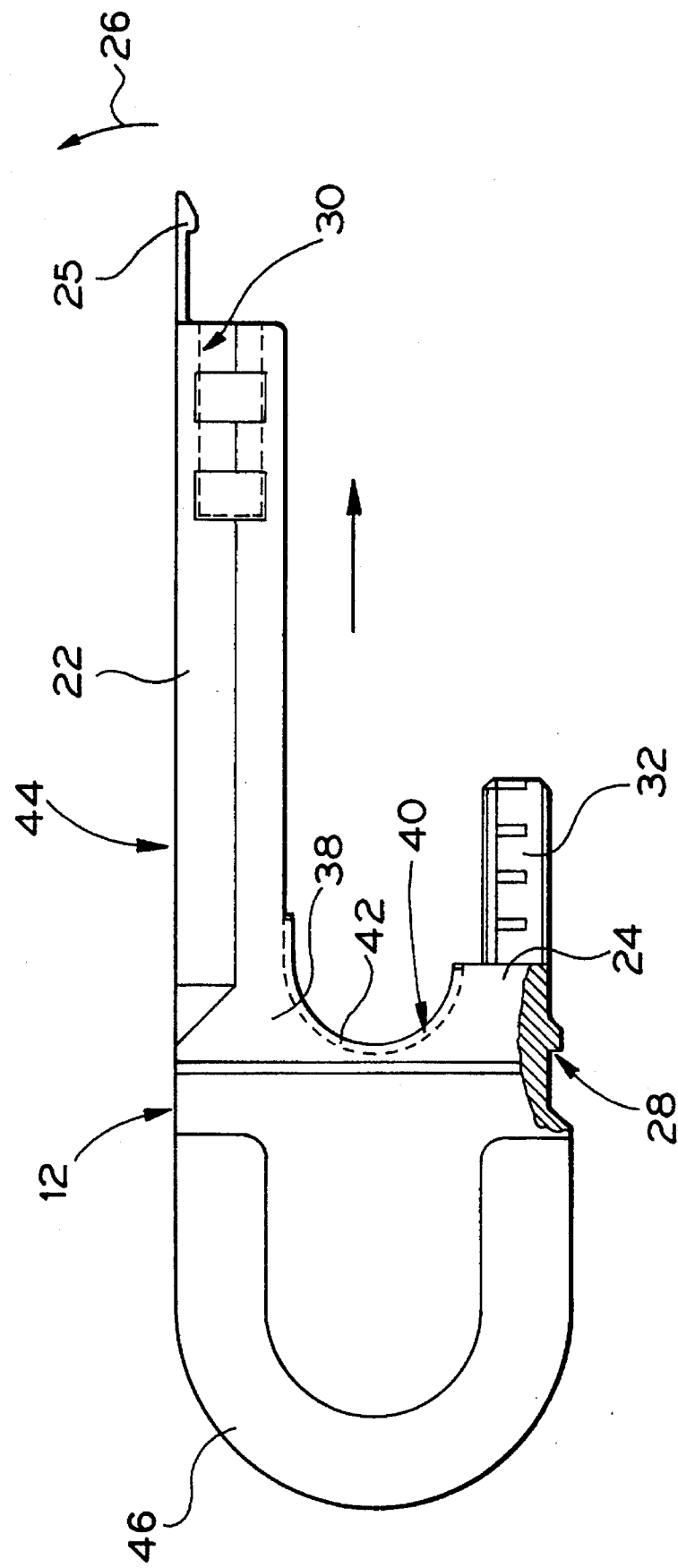

SUPPORTING DEVICE FOR A MACHINE

BACKGROUND OF THE INVENTION

The invention relates to a supporting device for a machine.

Modern machines, due to their slim construction and their function-dependent weight distribution and the need to stand them up on edge, often lack the necessary stability. This is true, for example, of small computer units or the like which are installed in offices where there is a lot of activity.

A supporting device has already been proposed that essentially comprising a supporting foot which can be placed onto a standing foot. For the fitting of this supporting foot, the machine has to be raised or tilted to enable the supporting foot to be placed from below onto the standing foot. Due to the often heavy weight of the machines, this process is difficult and can occasionally only be performed with the use of auxiliary tools. Particularly where the standing feet are configured as castors, there is the risk, moreover, of the machine slipping away when tilted and of no longer being able to be held. A further disadvantage can be seen in the fact that the fastening base of the individual supporting foot on the standing foot is relatively small, so that, if a tilt load should occur, large forces come to bear upon the fastening region of the supporting foot, thereby giving rise to the risk of the supporting foot being loosened or damaged.

SUMMARY OF THE INVENTION

U.S. Pat. No. 4,872,733 discloses a supporting device in which two bow-shaped supporting elements are disposed on a standing pedestal such that they can be swiveled between a non-operating position folded beneath the machine and not protruding beyond the lateral contour of the said machine and an unfolded operating position protruding over the lateral contour in the style of a supporting bracket. This arrangement is constructionally complex. Moreover, the supporting element can only be adjusted between these two positions if the machine is heavily tilted or tipped over, which has the drawbacks described earlier.

The object of the present invention is to provide a supporting device which can be fitted or dismantled without the machine being raised or tilted and which is simple to construct and inexpensive to manufacture.

This object is achieved according to the invention by a supporting device for a machine standing on a standing foot arrangement at a distance to the floor surface, consisting of at least one supporting element. It is adjustable between a non-operating position and an operating position in which it protrudes outwards, in the style of a supporting bracket, from the standing foot arrangement over the lateral contour of the machine. The supporting element has a separate holding section, which reaches, in the operating position, beneath the machine and is detachably connected to an assigned standing foot of the machine. A supporting bracket is disposed thereon, which protrudes over the lateral contour of the machine. The holding section is configured as an essentially U-shaped bow having two arms which bear, in the fitted position, laterally against the standing foot. There are provided on the holding section, in a direction perpendicular to the floor surface, stop faces, interacting with counter-faces of the standing foot, for fixing the holding section to the standing foot. The holding section, in the case of a standing machine, can be pushed beneath this in such a way that the two arms bear on both sides against an assigned standing foot. In the final operating position, the stop faces of the holding section bear against the counter-faces of the standing foot and fix the holding part to the standing foot in a direction perpendicular to the floor surface. The supporting bracket then protrudes, for example, over the lateral limits of the machine, to be precise, far enough to enable the stability requirements or the stability-defining test criteria to be satisfied. The dismantling of the supporting element is carried out in the reverse order by pulling it out from beneath, in the case of a standing machine.

The supporting element can be very simple in its form and in its construction and can thus be very inexpensive, as is described in still further detail with reference to an illustrative embodiment.

In order to improve further the connection of the supporting elements to the assigned standing feet, it is envisioned according to the invention that the arms should respectively be provided, at their ends, with devices for coupling the arms to the arms of a second supporting element assigned to a second supporting foot. Each supporting element is thus not only fastened to the standing foot which is assigned to it, but is also connected, via the coupling devices and the second supporting element, to the second standing foot, so that a large fastening base is produced which reduces the holding forces. The risk of the supporting element being loosened or damaged whenever a tilting moment acts upon the machine is thus largely precluded. In order to interconnect two supporting elements, there is configured, according to the invention, on one arm of each supporting element an elastic snap hook and on the other arm a latch recess for the reception of a snap hook. Upon coupling, the snap hook of one supporting element is respectively engaged with the latch recess of the other supporting element.

In a further embodiment of the invention, it is envisaged that on one arm of the supporting element there should be configured a centering spigot aligned in the longitudinal direction of the arm and on the respective other arm a centering recess, aligned in the longitudinal direction of this arm, for the reception of a centering spigot. When the two supporting elements are put together, the centering spigots are captured by the centering recesses, so that the two supporting elements are exactly aligned relative to each other.

It is further envisaged according to the invention that one arm of the supporting element should be of such a length that, in the operating position, it protrudes over the assigned standing foot, the respective other arm having a comparatively shorter length. The fitting of the supporting element is thereby made considerably easier, since it is not necessary to capture the assigned standing foot simultaneously with both arms. Instead the supporting element can be drawn up to the standing foot eccentrically thereto and then moved laterally until the longer arm is bearing against the standing foot. The supporting element is thereby exactly aligned relative to the standing foot and can now be brought, by longitudinal displacement along the standing foot, into its operating position. The second arm must have a shorter length relative to the first arm, since it interacts with the respective longer arm of the second supporting element.

According to one embodiment of the invention, the holding section has a vertical thickness corresponding to the distance of the machine from the floor. The bottom of the machine is thus essentially seated directly upon the supporting element and the supporting element upon the floor surface, so that stability is also thereby improved.

In order additionally to improve the slip-proofness of a machine supported in this way, it is envisioned according to the invention that the bearing surface of the supporting elements and/or of the connecting piece should be provided with a friction covering.

According to another embodiment of the invention, the supporting element has, in its operating position, a short distance from the floor surface. The effect of this is that a machine which has standing feet configured as castors, for example, can be transported even with a fitted supporting device, whereupon even slight bumps are not a nuisance.

In a further embodiment of the invention, it is envisaged that the device for coupling the arms of two supporting elements has spring means which, upon the coupling of the supporting elements, are pre-tensioned counter to the direction of the coupling motion. As a result of this pre-tensioning force, the two coupled supporting elements, following the detachment of the snap hook, are forced far enough apart that, after the snap hooks have been released, these are no longer able to latch-lock into the assigned receiving fixture. The coupling devices thereby remain detached and the supporting elements can be simply removed from the assigned standing feet.

In a further embodiment of the invention, the supporting device also has a connecting piece for connecting two supporting elements. This connecting piece essentially has a center plate and two joining parts which are disposed on the center plate, are aligned in opposite directions and correspond to a respective holding section. The connecting piece according to the invention offers the possibility of not only individually supporting two machines which are to be installed side by side, but also of interconnecting them, thereby further enhancing the stability of each individual machine. Moreover, the connecting piece also ensures that a defined minimum distance between two machines which is necessary for a possible cooling of the machines is not undershot.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 shows a side view of a machine standing on a floor surface and two supporting elements in the dismantled state;

FIG. 2 shows a top view onto an arrangement according to FIG. 1.

FIG. 3 shows two supporting elements and a connecting piece in the dismantled state in a top view;

FIG. 4 shows two supporting elements and a connecting piece in the fitted state in a top view;

FIG. 5 shows two supporting elements in the fitted state in a top view and a process for detaching the supporting elements;

FIG. 6 shows an individual supporting element in enlarged representation in a top view.

DESCRIPTION OF THE PREFERRED EMBODIMENT

The machine 2 represented in FIG. 1 in a side view stands on a plurality of standing feet, of which in FIG. 1 only the two adjacently disposed standing feet 4 and 6 are visible. These are, for example, known ball castor feet.

FIG. 2 shows the machine 2 in a top view. As can be seen, it has four standing feet 4, 6, 8, 10. In order to increase the stability of the machine 2, supporting elements 12 to 18 can be assigned to the standing feet 4 to 10.

FIG. 2 shows the case in which the machine 2 has a free-standing installation in all directions. However, if the machine 2 stands, for example, having its right side-wall 20 in FIGS. 1 and 2 against a wall, so that it only needs to be secured against tilting to the left, then it may be sufficient to attach the supporting elements 12 or 16 only to the standing feet 4 and 8.

The supporting elements 12 to 18 are identically constructed. This construction is described below with reference to FIG. 6. The supporting element 12 is configured as an essentially U-shaped bow having two arms 22, 24. The upper arm 22 in FIG. 6 bears, at its end, an elastic snap hook 25, which is elastically deflectable in the direction of the arrow 26. The lower arm 24 in FIG. 6 has, on its outer side, a latch recess 28, into which the snap hook of a second supporting element (for example the supporting element 14 in FIG. 2) to be coupled to the supporting element 12 is able to latch-lock.

On the upper arm 22 in FIG. 6 there is configured a centering recess 30, which is aligned in the longitudinal direction of the said arm and is shown in dashed representation in FIG. 6. The lower arm 24 in FIG. 6 bears a centering spigot 32, which is likewise aligned in the longitudinal direction and the outer profile of which corresponds to the inner profile of the centering recess 30.

As can be seen in particular from FIG. 2 in conjunction with FIG. 5, for the fitting of the supporting device the supporting element 12, for example, is pushed up in the direction of the arrow 34 onto the standing foot 4, whereupon the two arms 22, 24 come laterally to bear against the standing foot 4. At the same time, the supporting element 14 is pushed in the same way onto the standing foot 6. The centering spigot 32 of the supporting element 12 hereupon enters into a centering recess (not represented) configured on the opposite arm 22' of the supporting element 14.

At the same time, the centering spigot 32' disposed on the upper arm 24' of the supporting element 14 enters into the centering recess 30 configured on the opposite arm 22 of the supporting element 12. When both supporting elements 12, 14 occupy the operating position represented in FIG. 5, the snap hook 25 of the supporting element 12 is latch-locked into a corresponding latch recess of the supporting element 14, whilst the snap hook 25' of the supporting element 14 engages in the latch recess 28 of the supporting element 12.

As can be seen from the figures, the standing feet 4 to 10 have an essentially cylindrical form. They are provided in their upper region with a peripheral groove 36 (see FIG. 1). As can be seen from FIG. 6, the two arms 22, 24 of the supporting element 12 are interconnected via a connecting section 38 having a contact surface 40 which is matched to the outer contour of the standing feet and which, in the present case, is likewise cylindrical. On this contact surface 40 there is configured an inner flange 42, which extends in the peripheral direction and engages in the peripheral groove 36 of the standing foot and thus fixes the supporting element in relation to the standing foot in the vertical direction. The standing foot 4 projects preferably by a short amount beyond the underside of the fitted supporting element 12, so that the latter does not obstruct any transporting of the machine. The supporting element only comes into contact with the floor once the machine has a slight angle of tilt and it then assumes its supporting function. Following the fitting, the supporting elements 12 and 14 represented in FIG. 5 are firmly connected to each other and to the standing feet 4 and 6 respectively.

The arms 22, 24 and the connecting section 38 together form the holding section 44 of the supporting element 12. This holding section is connected in one piece to a supporting bracket 46, which laterally projects over the contour of the machine 2 and hence enlarges the supporting base of the said machine.

The supporting elements 12 to 18 are identically constructed. As is represented, in particular, in the example of the supporting element 12 in FIG. 6, the upper arm 22 in this figure is sufficiently long for it to project, in the operating position of the supporting element, over the assigned standing foot 4, whilst the lower arm 24 is shorter by comparison. The upper arm 22 interacts with a short arm 24' of the second supporting element 14, whilst the short arm 24 interacts with the longer arm 22' of the supporting element 14. This configuration facilitates the fitting of the supporting element, since, unlike in a configuration having arms of equal length, it is not necessary to capture the respectively assigned standing foot exactly. Instead, the long arm 22 of the supporting element 12, for example, can initially be brought to bear, in simple manner, against the assigned standing foot 4 and then displaced along the standing foot until the supporting element assumes its operating position.

In order to dismantle the supporting device represented in FIG. 5, the two snap hooks 25 and 25' are lifted by means of two screwdrivers, for example, out of the assigned latch recesses. In order to facilitate the dismantling, the ends of the centering spigots 32 and 32' are resiliently configured, for example, such that, upon the coupling of the supporting elements 12 and 14, they are pressed together and generate a pre-tensioning force acting in the direction of detachment. This pre-tensioning force has the effect that, after the snap hooks 25, 25' have been lifted out, the supporting elements 12 and 14 are automatically forced apart, so that even after the snap hooks have been released, they are no longer able to latch-lock. The supporting elements 12, 14 can then be readily pulled off outwards from the assigned standing feet.

FIGS. 3 and 4 show a variant of the invention which enables two machines 50, 52 to be securely supported and, at the same time, connected to each other. For this purpose, a connecting piece 54 is provided, comprising a center plate 56 on which there are disposed two joining parts 58, 60 aligned in opposite directions. As can be readily seen, these joining parts 58, 60 respectively correspond to the holding sections 44 of the supporting elements, so that they do not need to be described in detail. The joining parts 58 and 60 can therefore be readily coupled to the supporting elements 62 and 64 in the manner already described. The center plate 56 here has, on the one hand, the function of a supporting bracket, on the other hand, that of a connecting piece or spacer for the two supporting elements 62 and 64 and hence for the machines 50 and 52 to be connected.

FIG. 4 shows the connecting piece 54 and the two supporting elements 62 and 64 in a state in which they are coupled together and are connected to standing feet of assigned machines 50 and 52. Due to the interconnection of the two machines 50, 52, excellent stability of the total arrangement is obtained. It is additionally ensured, by virtue of the connecting piece 54, that the two machines 50, 52 are at a predefined distance relative to each other.

As does not need to be represented in greater detail, the supporting elements and the connecting piece can be provided, on their bearing surface resting upon the floor surface, with a friction covering in order to improve the slip-proofness of the machines or of the arrangements of machines.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A supporting device in combination with a machine standing on a floor surface of a floor, the machine having a standing foot arrangement on a bottom side thereof, the standing foot arrangement having standing feet;

said supporting device comprising at least one supporting element, which is adjustable between a non-operating position and an operating position in which the supporting element protrudes outwards from the standing foot arrangement over a lateral contour of the machine;

the supporting element having a holding section, which reaches, in the operating position, beneath the machine and is detachably connected to an assigned standing foot of the machine, and having a supporting bracket disposed thereon, which protrudes over the lateral contour of the machine;

the holding section being configured as a substantially U-shaped bow having two arms which bear laterally against the standing foot;

the holding section having, in a direction perpendicular to the floor surface, stop faces, interacting with counter-faces of the standing foot, for fixing the holding section to the standing foot; and one arm of the two arms of the supporting element having an elastic snap hook and the other arm of the two arms of the supporting element having a latch recess for elastic snap hook reception.

2. The supporting device as claimed in claim 1, wherein one arm of the two arms of the supporting element has a centering spigot aligned in a longitudinal direction of the one arm and the other arm of the two arms of the supporting element has a centering recess, aligned in a longitudinal direction of said other arm, for reception of a further centering spigot.

3. A supporting device in combination with a machine standing on a floor surface of a floor, the machine having a standing foot arrangement on a bottom side thereof, the standing foot arrangement having standing feet;

said supporting device comprising at least one supporting element, which is adjustable between a non-operating position and an operating position in which the supporting element protrudes outwards from the standing foot arrangement over a lateral contour of the machine;

the supporting element having a holding section, which reaches, in the operating position, beneath the machine and is detachably connected to an assigned standing foot of the machine, and having a supporting bracket disposed thereon, which protrudes over the lateral contour of the machine;

the holding section being configured as a substantially U-shaped bow having two arms which bear laterally against the standing foot;

the holding section having, in a direction perpendicular to the floor surface, stop faces, interacting with counterfaces of the standing foot, for fixing the holding section to the standing foot; and one arm of the two arms of the supporting element having a length such that, in the operating position, said one arm protrudes over a respective standing foot, and the other arm of the two arms of the supporting element having a comparatively shorter length than the length of said one arm.

4. A supporting device in combination with a machine standing on a floor surface of a floor, the machine having a standing foot arrangement on a bottom side thereof, the standing foot arrangement having standing feet;

said supporting device comprising at least one supporting element, which is adjustable between a non-operating position and an operating position in which the supporting element protrudes outwards from the standing foot arrangement over a lateral contour of the machine;

the supporting element having a holding section, which reaches, in the operating position, beneath the machine and is detachably connected to an assigned standing foot of the machine, and having a supporting bracket disposed thereon, which protrudes over the lateral contour of the machine;

the holding section being configured as a substantially U-shaped bow having two arms which bear laterally against the standing foot;

the holding section having, in a direction perpendicular to the floor surface, stop faces, interacting with counterfaces of the standing foot, for fixing the holding section to the standing foot;

the two arms of the supporting element being interconnected by a connecting section having a shape matched to an outer form of a standing foot; and the connecting section having a contact surface for contact against the standing foot, said contact surface having at least one fixing projection for engagement into a fixing recess on the standing foot and vice versa.

5. A supporting device in combination with a machine standing on a floor surface of a floor, the machine having a standing foot arrangement on a bottom side thereof, the standing foot arrangement having standing feet;

said supporting device comprising at least one supporting element, which is adjustable between a non-operating position and an operating position in which the supporting element protrudes outwards from the standing foot arrangement over a lateral contour of the machine;

the supporting element having a holding section, which reaches, in the operating position, beneath the machine and is detachably connected to an assigned standing foot of the machine, and having a supporting bracket disposed thereon, which protrudes over the lateral contour of the machine, the assigned standing foot having a peripheral groove;

the holding section being configured as a substantially U-shaped bow having two arms which bear laterally against the standing foot;

the holding section having, in a direction perpendicular to the floor surface, stop faces, interacting with counterfaces of the standing foot, for fixing the holding section to the standing foot; and a connecting section interconnecting the two arms of the supporting element, the connecting section having a semi-cylindrical contact surface and an inner flange that projects from the contact surface, the inner flange extending in the peripheral direction for engagement in the peripheral groove configured on the standing foot.

6. A supporting device in combination with a machine standing on a floor surface of a floor, the machine having a standing foot arrangement on a bottom side thereof, the standing foot arrangement having standing feet;

said supporting device comprised first and second supporting elements, each of said first and second supporting elements being adjustable between a non-operating position and an operating position in which the respective supporting element protrudes outwards from the standing foot arrangement over a lateral contour of the machine;

each of the supporting elements of the first and second supporting elements having a holding section, which reaches, in the operating position, beneath the machine and is detachably connected to an assigned standing foot of the machine, and having a supporting bracket disposed thereon, which protrudes over the lateral contour of the machine;

the holding section being configured as a substantially U-shaped bow having two arms which bear laterally against the standing foot;

the holding section having, in a direction perpendicular to the floor surface, stop faces, interacting with counterfaces of the standing foot, for fixing the holding section to the standing foot;

the two arms of each supporting element of the first and second supporting elements being respectively provided, at their ends, with devices for coupling arms of the first supporting element to arms of the second supporting element; and a connecting piece for connecting the first and second supporting elements, which connecting piece is formed from a center plate and two joining parts which are disposed on said center plate, are aligned in opposite directions and correspond to a respective holding section of a supporting element.

7. The supporting device as claimed in claim 6, wherein the supporting elements have a bearing surface, wherein the connecting piece has a bearing surface, and wherein at least one of the bearing surface of the supporting elements and the bearing surface of the connecting piece is provided with a friction covering.

8. The supporting device as claimed in claim 6, wherein each of the two supporting elements and the connecting piece have a thickness that is less than the distance of the machine from the floor surface and, when fitted on the machine, are at a slight distance from the floor surface.

* * * * *